United States Patent Office 2,935,522
Patented May 3, 1960

2,935,522

ORGANO-METALLIC TITANIUM COMPOUNDS

Carlos M. Samour, Brighton, Mass., assignor to The Kendall Company, Boston, Mass., a corporation of Massachusetts No Drawing. Application October 22, 1956
Serial No. 617,253

3 Claims. (Cl. 260—429.5)

This invention relates to new organo-metallic cyclic compounds of titanium and pertains more specifically to such compounds containing one nitrogen atom bonded to each titanium atom by a plurality of oxyalkylene linkages and containing no more than one alkoxy group attached to each titanium atom.

These new compounds may be obtained in the form of monomers in which each molecule contains a single titanium atoms as well as lower polymers in which the average degree of polymerization is from two to five, containing an average of 2 to 5 titanium atoms per molecule. Both monomers and polymers exist as colorless or slightly amber colored solid materials. The compounds of the present invention are useful as surface-active agents, as adhesion promoters, and as transesterification catalysts, particularly for esterification of sterically hindered alcohols.

The new monomeric materials of the present invention hav the following structure:

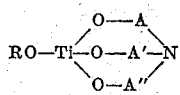

in which A, A' and A" are either—CH$_2$CH$_2$—or

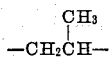

groups and R is a lower alkyl group containing from 1 to 6 carbon atoms. Inasmuch as the titanium atom possesses two secondary valences in addition to four primary valences, the nitrogen atom is believed to be chelated or bonded to the titanium by a secondary valence bond in addition to the primary valance bonds which connect these atoms. The single remaining secondary valance of the titanium may account in part at least for the utility of the materials as surface-active agents and as adhesion promoters.

Although these new compounds are reasonably stable materials, the monomeric materials tend to undergo addition polymerization slowly over a period of months when stored at room temperature. Careful purification of the monomeric materials, as by recrystallation, reduces the tendency toward polymerization.

The following specific examples are intended to illustrate more clearly the nature of the invention without being intended as a limitation upon its scope.

Example 1

There were placed in a dry glass flask 86.2 g. (0.4545 mole) of purified titanium tetrachloride and 450 ml. of dry reagent-grade chloroform, the foregoing materials being introduced into the flask in a dry box in order to preclude the possibility of any hydrolysis of the titanium tetrachloride. After dissolution of the titanium tetrachloride in the chloroform there was added with vigorous stirring, while cooling the solution in an ice bath, dry ammonia gas until no further absorption occurred. During introduction of the ammonia a yellow precipitate separated.

The flask was then removed from the ice bath and there were added to the reaction mixture 30 g. (0.5 mole) of dry isopropyl alcohol dissolved in 25 ml. of dry chloroform, the adidtion being carried out over a period of 30 minutes in order to avoid excessive rate of evolution of ammonia gas. Stirring of the reaction mixture continued for another 20 minutes when the addition of 67.8 g. (0.4545 mole) of pure triethanolamine (B.P., 148° C. at less than 0.01 mm. pressure) dissolved in 75 ml. of dry chloroform was begun. The addition of this reagent was carried out slowly over a total time of about 2 hours. The flask was then heated very slowly to the boiling point under a reflux condenser and refluxing was continued for 19 hours, during which time ammonia continued to be evolved at a decreasing rate, after which time the very finely divided colorless solid material present (primarily ammonium chloride containing a small amount of a titanium compound) was removed by filtration. The solid precipitate was washed with four portions of approximately 100 ml. each of dry chloroform. The filtrate and the chloroform employed for washing the precipitate were combined, and the chloroform was removed by evaporation initially at atmospheric pressure and finally at reduced pressure. The residue consisted of 105.8 g. of an amber-colored, glassy or amorphous solid having the structure

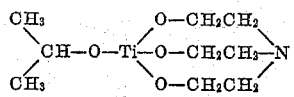

The solid precipitate mentioned above contained, after washing with chloroform, the equivalent of 2.6 g. of titanium dioxide, which is equivalent to 8.2 g. of the product.

The dry solid product was very soluble in water and chloroform and moderately soluble in carbon disulfide. In water solution partial hydrolysis occurred, with the liberation of isopropyl alcohol but without the formation of any precipitate. In an open tube the product did not melt but decomposed at a temperature above 300° C. In a sealed tube the product underwent a phase transition at about 116° C. (corr.) and showed a final melting point of about 179° C. (corr.). Upon analysis it was found to have a composition corresponding to that calculated for the foregoing formula; its molecular weight (ebullioscopic in chloroform) was determined and was found to agree with the molecular weight of 253 calculated for the monomeric compound of the above formula.

The amorphous solid product was recrystallized from dry isopropyl alcohol to give a white crystalline solid found to possess the same composition and molecular weight (244±8 ebullioscopic in chloroform).

Potentiometric titration of a 0.4 molar aqueous solution of the product with 0.5 N. hydrochloric acid resulted only in a gradual decrease of pH from an initial value of 8.3 for the solution without any sharp inflection in the curve obtained by plotting pH against the quantity of acid added up until the appearance of an insoluble precipitate at about 25% neutralization. Upon complete neutralization a gelatinous precipitate consisting predominantly of titanium oxide hydrate was present. Both the amorphous and recrystallized products were found to have surface-active properties, particularly in nonaqueous solutions, as well as adhesion-promoting properties, and also were effective as transesterification catalysts.

Similar compounds may be made in which the isopropyl group is replaced by other lower alkyl groups containing up to 6 carbon atoms by selecting the appropriate alcohol as a reagent.

*Example 2*

The procedure was the same as in Example 1 above except that triisopropanolamine was substituted for the triethanolamine in equivalent molecular proportions. The product thus obtainable possessed the following structure:

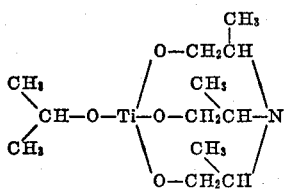

The product exhibited chemical and physical properties very similar to those found for the products described in Example 1 above, but could readily be distinguished by ultimate analysis, molecular weight determination, and by potentiometric titration. It could readily be recrystallized from isopropyl alcohol, and in a sealed tube underwent a phase transition at 92.5° C. (corr.) and showed a final melting point of about 107° C. (corr.). Upon analysis it was found to have a composition and molecular weight substantially identical with the values calculated for the compound of the foregoing formula.

*Example 3*

The amorphous solid product of Example 1 was allowed to stand in a tightly sealed container at room temperature for approximately three months. Although no marked change in appearance occurred, and although analysis indicated that there had been no change in composition, the molecular weight was found (cryoscopic in bromoform) to have increased to 405±60. In another preparation, the material after standing six months at room temperature had a molecular weight of 705±35.

Similarly, the recrystallized specimen of Example 1 after storage in a sealed container at room temperature for seven months was found to have an increased molecular weight (cryoscopic in bromoform) of 302±10 while its composition remained unchanged.

Although there have been described in the foregoing examples specific methods for the manufacture of the compounds of the present invention, it will be understood that other methods such as an ester interchange reaction between the appropriate aminoalcohol and an alkyl titanate may be employed.

Although specific embodiments of the invention have been described herein, it is not intended to limit the invention solely thereto, but to include all of the obvious variations and modifications within the spirit and scope of the appended claims.

I claim:

1. A solid organo-metallic titanium compound selected from the class consisting of those having the structure

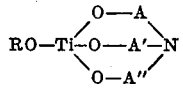

in which A, A' and A'' are members of the class consisting of —CH$_2$CH$_2$— and

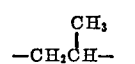

groups and R is a lower alkyl group.

2. A solid organo-metallic titanium compound having the structure

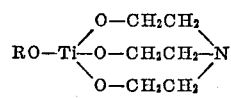

in which R is a lower alkyl group.

3. A solid organo-metallic titanium compound having the structure

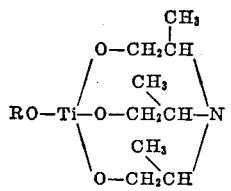

in which R is a lower alkyl group.

References Cited in the file of this patent

UNITED STATES PATENTS

| | | |
|---|---|---|
| 2,579,414 | Boyd | Oct. 21, 1949 |
| 2,824,114 | Bostwick | Feb. 18, 1958 |

FOREIGN PATENTS

| | | |
|---|---|---|
| 150,690 | Sweden | July 12, 1955 |
| 517,357 | Canada | Oct. 11, 1955 |